US008623544B2

(12) United States Patent
Tsuchiya et al.

(10) Patent No.: US 8,623,544 B2
(45) Date of Patent: Jan. 7, 2014

(54) ELECTRODE STRUCTURE AND BATTERY DEVICE MANUFACTURING METHOD

(75) Inventors: Takenori Tsuchiya, Toyota (JP); Hiroki Nagai, Nagoya (JP); Masahide Hikosaka, Toyohashi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 13/530,875

(22) Filed: Jun. 22, 2012

(65) Prior Publication Data

US 2012/0264003 A1 Oct. 18, 2012

Related U.S. Application Data

(62) Division of application No. 12/522,005, filed as application No. PCT/JP2008/050657 on Jan. 11, 2008.

(30) Foreign Application Priority Data

Jan. 12, 2007 (JP) .................................. 2007-004529
Aug. 14, 2007 (JP) .................................. 2007-211258

(51) Int. Cl.
  *H01M 2/02* (2006.01)
  *H01R 4/38* (2006.01)
(52) U.S. Cl.
  USPC ........... 429/163; 429/178; 429/185; 429/181; 439/765; 439/627
(58) Field of Classification Search
  None
  See application file for complete search history.

(56) References Cited

U.S. PATENT DOCUMENTS

| 1,373,241 | A |   | 3/1921 | Heberling et al. |
| 3,081,254 | A |   | 3/1963 | Morgan |
| 3,565,783 | A |   | 2/1971 | Emery et al. |
| 4,722,703 | A |   | 2/1988 | Hufnagl |
| 5,851,129 | A |   | 12/1998 | Matsunaga et al. |
| 5,851,695 | A | * | 12/1998 | Misra et al. ................... 429/159 |
| 5,906,899 | A | * | 5/1999 | Noda et al. ................... 429/149 |
| 5,985,480 | A |   | 11/1999 | Sato et al. |
| 6,672,911 | B2 | * | 1/2004 | Zhao et al. ................... 439/845 |

(Continued)

FOREIGN PATENT DOCUMENTS

| CN | 1838466 | 9/2006 |
| JP | 63-22064 | 2/1988 |

(Continued)

OTHER PUBLICATIONS

Notice of Grounds of Rejection for JP Appl. No. 2010-262668 dated Jan. 17, 2012.

(Continued)

*Primary Examiner* — Patrick Ryan
*Assistant Examiner* — Jose Colucci Rios
(74) *Attorney, Agent, or Firm* — Finnegan, Henderson, Farabow, Garrett & Dunner, LLP

(57) ABSTRACT

An electrode is provided with a metal terminal extending from a battery module main body, a bolt which has an expanded section configuring a retaining section at a rear end portion and penetrates the metal terminal upward, and an insulating body which insulates the metal terminal and the battery module case one from the other. The insulating body is provided with a drop preventing section which abuts at least a lower surface of the expanded section of the bolt and prevents the bolt from dropping from the metal terminal.

5 Claims, 12 Drawing Sheets

(56) References Cited

U.S. PATENT DOCUMENTS

| | | | |
|---|---|---|---|
| 7,077,704 | B2 | 7/2006 | Ikeda et al. |
| 7,163,764 | B2 | 1/2007 | Ratte |
| 7,736,796 | B2 | 6/2010 | Nagatani et al. |
| 7,935,438 | B2 | 5/2011 | Kim |
| 8,038,487 | B2 | 10/2011 | Tsuchiya et al. |
| 2002/0114994 | A1 | 8/2002 | Yabuki et al. |
| 2003/0141842 | A1 | 7/2003 | Izawa et al. |
| 2004/0106038 | A1* | 6/2004 | Shimamura et al. ......... 429/152 |
| 2004/0191612 | A1 | 9/2004 | Akita et al. |
| 2005/0084751 | A1* | 4/2005 | Ratte ........................... 429/182 |
| 2006/0105624 | A1 | 5/2006 | Yoshikane et al. |
| 2006/0216593 | A1 | 9/2006 | Jung et al. |
| 2007/0054561 | A1* | 3/2007 | Gutman et al. ............... 439/656 |

FOREIGN PATENT DOCUMENTS

| | | |
|---|---|---|
| JP | 7-226197 | 8/1995 |
| JP | 09-022688 | 1/1997 |
| JP | 10-64610 | 3/1998 |
| JP | 10-270009 | 10/1998 |
| JP | 2000-100420 | 4/2000 |
| JP | 2000-331656 | 11/2000 |
| JP | 2001-084991 | 3/2001 |
| JP | 2001-110398 | 4/2001 |
| JP | 2002-8627 | 1/2002 |
| JP | 2002-42753 | 2/2002 |
| JP | 2002-175795 | 6/2002 |
| JP | 2002-190289 A | 7/2002 |
| JP | 2002-343336 | 11/2002 |
| JP | 2003-031205 | 1/2003 |
| JP | 2003-077454 | 3/2003 |
| JP | 2003-092103 | 3/2003 |
| JP | 2003-229106 | 8/2003 |
| JP | 2003-346774 | 12/2003 |
| JP | 2003-346778 | 12/2003 |
| JP | 2004-247320 | 9/2004 |
| JP | 2004-265841 | 9/2004 |
| JP | 2005-285406 | 10/2005 |
| JP | 2005-347043 | 12/2005 |
| JP | 2005-353547 | 12/2005 |
| JP | 2006-48996 | 2/2006 |
| JP | 2006-147319 A | 6/2006 |
| JP | 2007-048600 A | 2/2007 |
| JP | 2008-166270 | 7/2008 |
| JP | 2008-192595 | 8/2008 |

OTHER PUBLICATIONS

Notice of Grounds for Rejection for JP Appl. No. 2010-262666 dated Jan. 17, 2012.
Decision to Grant Patent for JP Appln. No. 2008-553137 dated Dec. 21, 2010.
Office Action in U.S. Appl. No. 12/522,005 mailed on May 22, 2012.
Decision to Grant Patent in Japanese Application No. 2012-059876 dated May 15, 2012.
Notice of Grounds of Rejection in Japanese Application No. 2012-059873 dated May 15, 2012.
Office Action mailed on Jan. 18, 2013 in U.S. Appl. No. 13/531,051.
Office Action mailed on Jan. 22, 2013 in U.S. Appl. No. 13/530,975.
Office Action issued in U.S. Appl. No. 13/531,171 on Apr. 29, 2013.
Office Action issued in U.S. Appl. No. 12/522,005 on Apr. 30, 2013.
Office Action issued in U.S. Appl. No. 13/531,171 on Oct. 1, 2013.
Advisory Action issued in U.S. Appl. No. 12/522,005 on Oct. 11, 2013.

* cited by examiner

ELECTRODE STRUCTURE AND BATTERY DEVICE MANUFACTURING METHOD

This is a divisional application of application Ser. No. 12/522,005 filed Jul. 2, 2009, which is a national phase application of International Application No. PCT/JP2008/050657, filed Jan. 11, 2008, and claims the priority of Japanese Application Nos. 2007-004529, filed Jan. 12, 2007, and 2007-211258, filed Aug. 14, 2007, the contents of all of which are incorporated herein by reference.

TECHNICAL FIELD

The present invention relates to an electrode structure and a method of manufacturing a battery device and, more specifically, to an electrode structure for connecting a battery module to a bus bar and to a method of manufacturing a battery device to which the bus bar is connected.

BACKGROUND ART

A battery device mounted on a hybrid vehicle or an electric vehicle has a plurality of battery modules connected in series or in parallel. The plurality of battery modules are connected to each other by a bus bar. The battery module is provided with an electrode to be connected to the bus bar.

For the connection to the bus bar, a bolt is attached to a metal terminal of the electrode. The bolt attached to the metal terminal penetrates through the bus bar, and screw-fixed in a nut, so that the bus bar is firmly fixed.

Considering the process step of attaching the bus bar to the electrode, it is preferred to have the bolt temporarily fixed in advance on the metal terminal. As a method of such temporary fixing of the bolt, it may be possible to insert the bolt with pressure to a through hole provided in the metal terminal.

Japanese Patent Laying-Open No. 2002-8627 (Patent Document 1) discloses battery modules connected by such a bus bar. According to Patent Document 1, a plurality of cylindrical battery modules are connected by a plate-shaped bus bar.

Japanese Patent Laying-Open No. 7-226197 (Patent Document 2) discloses a battery for a portable electric device, having an easily bendable part with reduced width or thickness between an electrode plate and a connecting part of a relay lead.

DISCLOSURE OF THE INVENTION

When the bolt is inserted with pressure to the metal terminal for temporarily fixing the bolt on the metal terminal, there is a problem that a fastening surface of the metal terminal may be deformed at the step of insertion with pressure. Further, for temporary fixing of the bolt, the step of inserting bolt to the metal terminal with pressure becomes necessary, leading to increased number of process steps.

The present invention was made to solve the above-described problems, and its object is to provide an electrode structure and a method of manufacturing a battery device that allows temporary fixing of the bolt on the metal terminal in an easy manner.

The present invention provides an electrode structure for connecting a battery module to a bus bar, including: a metal terminal extending from a body of the battery module; a bolt having an expanded section forming a retaining section at a rear end, and penetrating the metal terminal upward; and an insulator insulating the metal terminal and a case of the battery module from each other; wherein the insulator has a drop preventing section abutting on at least the expanded section of the bolt from below to prevent dropping of the bolt from the metal terminal.

In the electrode structure described above, preferably, the metal terminal has a fixing piece fixed to the case through the insulator, a connecting piece continuous from the fixing piece in a bending direction and having at least the portion continuous from the fixing piece extending in a direction away from the case, and a terminal piece continuous from the connecting piece in a bending direction and having a through hole through which the bolt penetrates. At this time, distance between the fixing piece and the terminal piece in a direction away from the case may be at least 50% of the width of the connecting piece and at least 5 times the thickness of the connecting piece.

In the electrode structure described above, preferably, the expanded section has a lower surface and a side surface; the drop preventing section has two abutting surfaces positioned in orthogonally intersecting directions with each other, with one abutting surface abutting on the lower surface of the expanded section and the other abutting surface abutting on the side surface of the expanded section.

In the electrode structure described above, preferably, the drop preventing section has a wall portion surrounding an outer periphery of the expanded section.

In the electrode structure described above, preferably, a plurality of bent portions are provided between the fixing piece and the terminal piece, and at least one of the plurality of bent portions is formed to be a stiffness reduced portion smaller in at least one of thickness and width than other portions of the metal terminal.

In the electrode described above, the stiffness reduced portion may be formed by depressing an inside corner of the bent portion in a dent to draw a curve.

The present invention also provides a method of manufacturing a battery device, including the steps of arranging a plurality of battery modules including an electrode provided with a metal terminal extending from a body of the battery module, a bolt having an expanded section forming a retaining section at a rear end, and penetrating the metal terminal upward, and an insulator having a drop preventing section abutting on at least the expanded section of the bolt from below to prevent dropping of the bolt from the metal terminal and insulating the metal terminal and a case of the battery module from each other; attaching a bus bar electrically connecting the electrodes by inserting the bolt to a through hole provided in the bus bar; and fixing the bus bar by fastening a nut to the bolt.

In the method of manufacturing a battery device described above, preferably, the metal terminal has a fixing piece fixed to the case through the insulator, a connecting piece continuous from the fixing piece and extending in a direction away from the case, and a terminal piece continuous from the connecting piece, extending approximately parallel to said fixing piece, and having a through hole through which the bolt penetrates.

Two or more of the above-described structures may be combined.

According to the electrode structure and the method of manufacturing the battery device of the present invention, temporary fixing is attained by an insulator and, therefore, the bolt can easily be fixed temporarily on the metal terminal. Further, using the temporarily fixed bolt, the bus bar can be attached easily to the electrode.

BEST MODES FOR CARRYING OUT THE INVENTION

Figure 1:
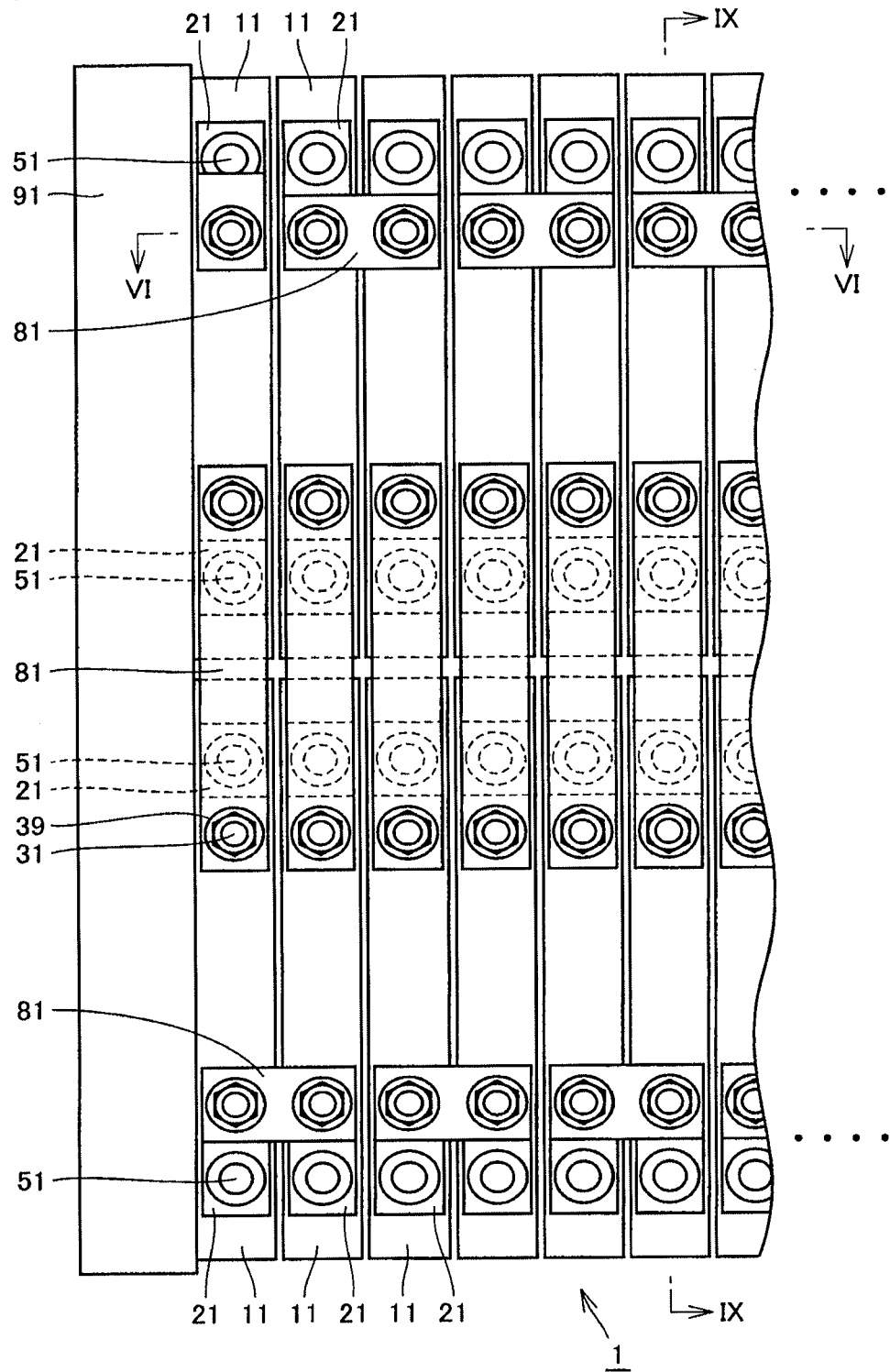
FIG. 1 is a plan view showing a structure of a battery device in accordance with Embodiment 1 of the present invention.

In the following, the electrode structure and the method of manufacturing a battery device in accordance with various embodiments of the present invention will be described with reference to the figures. In these embodiments, the same or corresponding portions are denoted by the same reference characters, and accumulative description will not be repeated.

Embodiment 1

FIG. 1 is a plan view showing a structure of a battery device in accordance with the present embodiment. As shown in FIG. 1, a battery device 1 has a plurality of battery modules 11. In battery device 1 shown in FIG. 1, battery modules 11 are arranged in two rows with their main surfaces positioned parallel to each other. Though an example in which battery modules 11 are arranged in two rows is shown here, the modules may be arranged in one row or in three or more rows.

Each battery module 11 has electrodes 21 serving as positive and negative electrodes, respectively. Electrodes 21 of battery modules 11 arranged side by side are connected to each other by a bus bar 81. Bus bar 81 is formed of plate-shaped metal.

At an end portion of the thus arranged plurality of battery modules 11, a binding plate 91 is provided. Binding plates 91 apply a force in compressing direction, to the thus arranged plurality of battery modules 11 from opposite end portions. Consequently, battery modules 11 are kept in the arranged state and appropriate pressure is applied to each battery module.

At the end portion opposite to the thus arranged plurality of battery modules 11, similar binding plate is also provided, though not shown. These two binding plates 91 are coupled by a coupling member, not shown.

Figure 2:
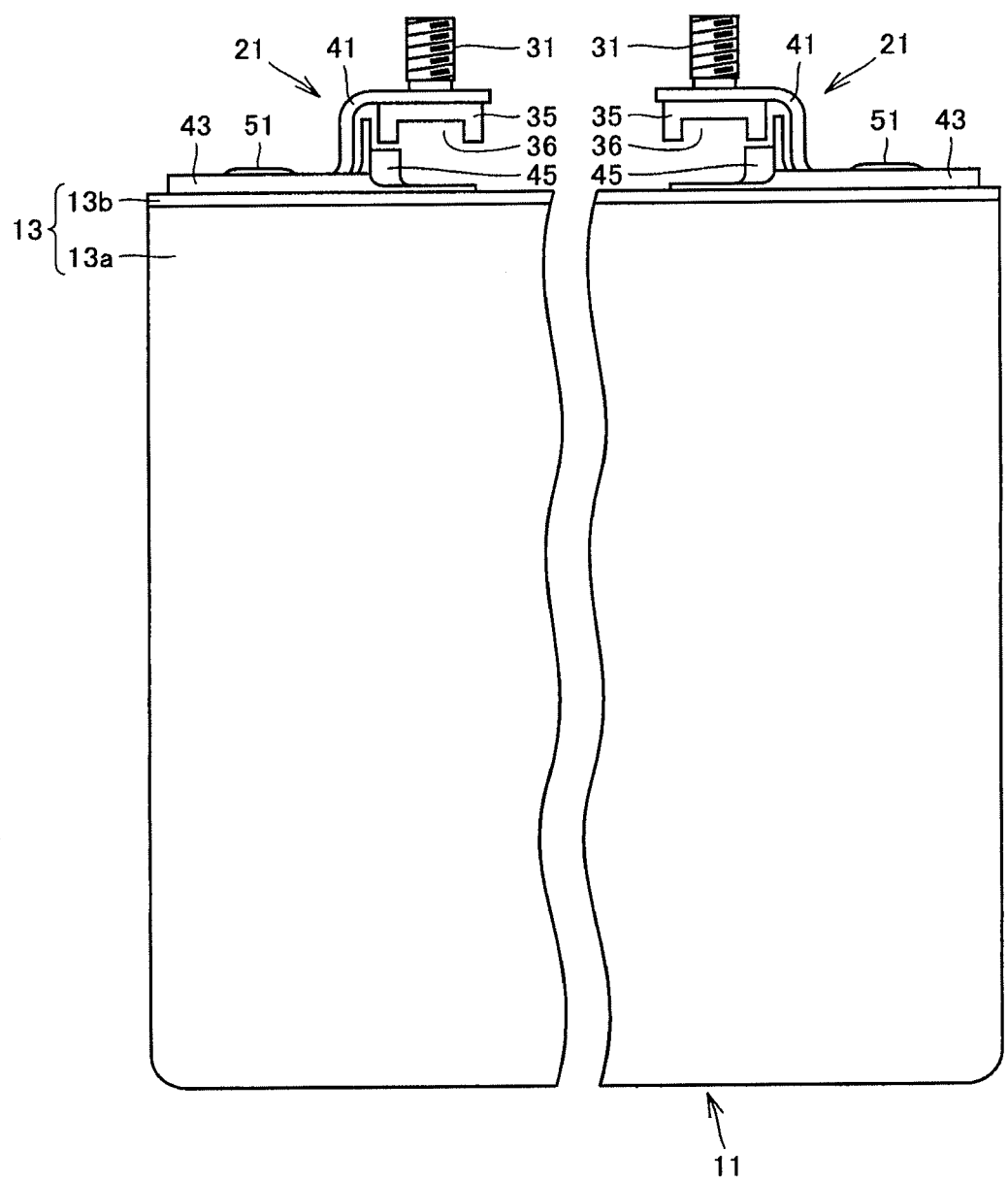
FIG. 2 is a side view of a battery module in accordance with Embodiment 1 of the present invention.
Figure 3:
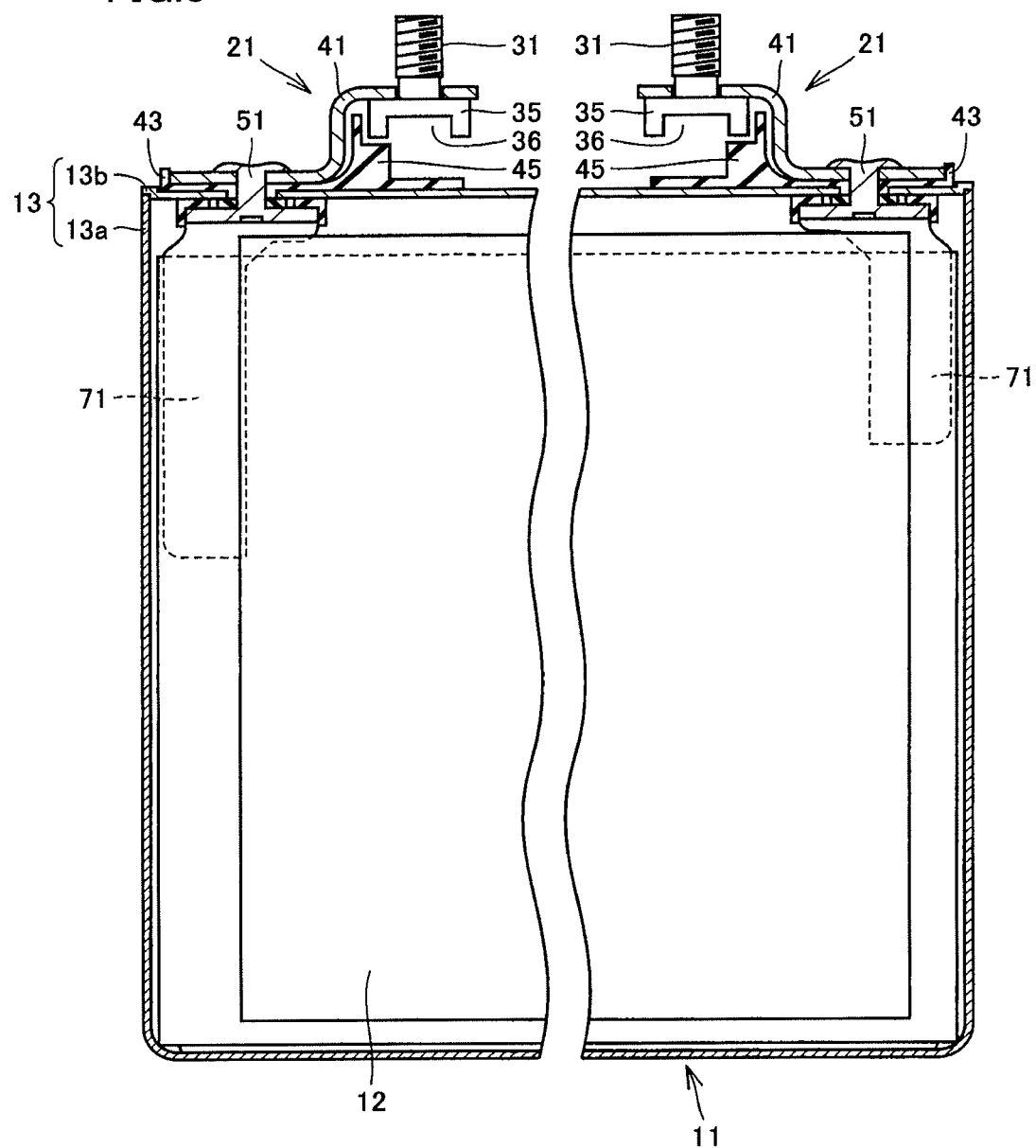
FIG. 3 is a vertical sectional view of the battery module in accordance with Embodiment 1 of the present invention.
Figure 4:
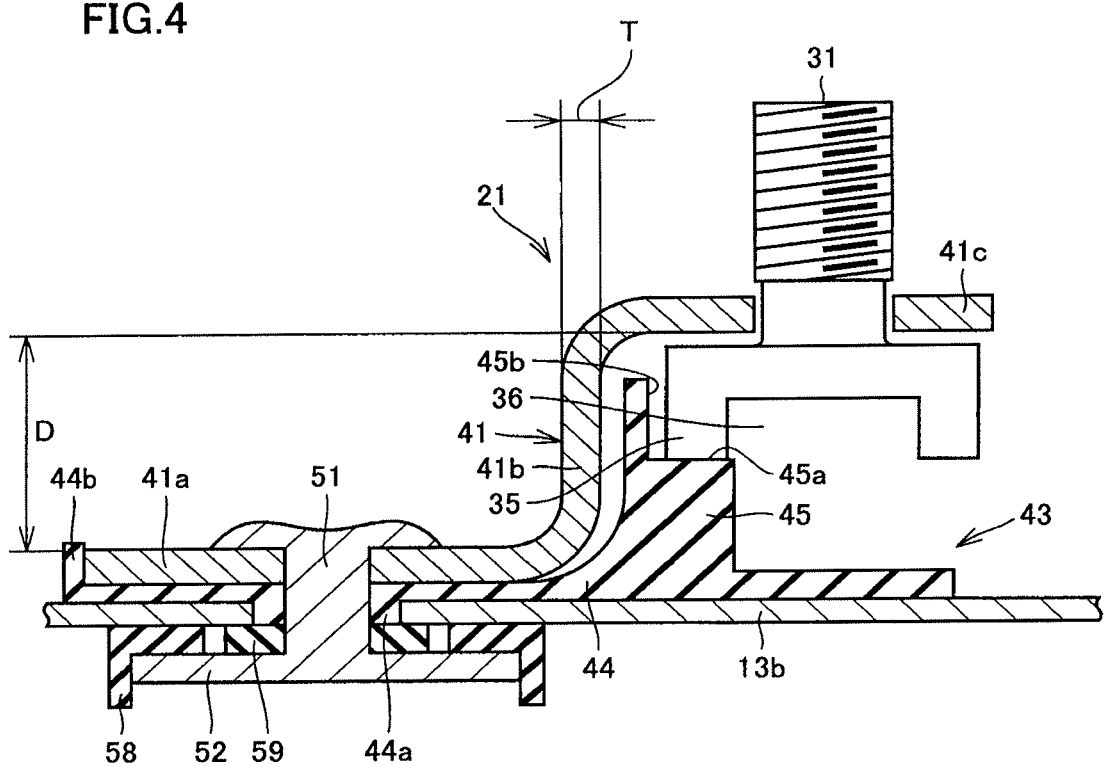
FIG. 4 is a vertical sectional view of an electrode in accordance with Embodiment 1 of the present invention.
Figure 5:
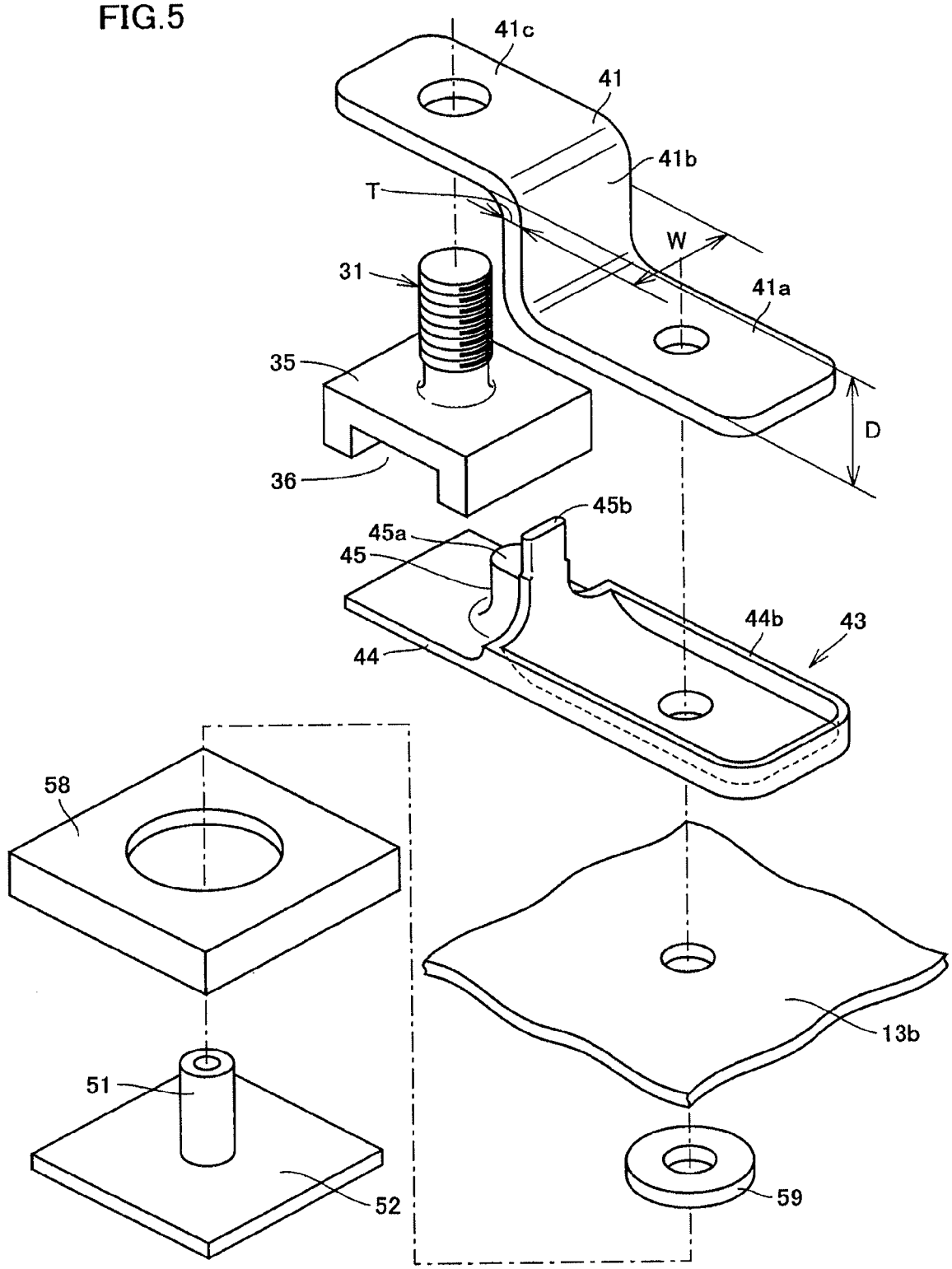
FIG. 5 is an exploded perspective view of the electrode in accordance with Embodiment 1 of the present invention.

FIG. 2 is a side view of the battery module in accordance with the present embodiment, FIG. 3 is a vertical sectional view of the same, FIG. 4 is a vertical sectional view of the electrode, and FIG. 5 is an exploded perspective view of the electrode. Battery module 11 has a battery cell 12 provided inside. Battery cell 12 is housed in a battery case 13. Battery cell 12 may be any rechargeable secondary battery and not specifically limited. By way of example, it may be a nickel hydride battery or a lithium ion battery. Though FIG. 2 shows an example in which one battery cell 12 is housed in one battery case 13, a plurality of battery cells may be housed. In the present specification, the battery module encompasses one having a plurality of battery cells provided in the battery case and one having one battery cell provided in the battery case. Further, in the present specification, the battery cell means a minimum unit that functions as a rechargeable secondary battery.

Battery case 13 includes a battery case body 13a and a lid 13b. In order to provide adequate strength, battery case 13 is formed, for example, of a galvanized sheet steel. Battery case body 13a has a box shape with a space inside and open only at the upper plane. Lid 13b has a plate shape. To lid 13b, a pair of electrodes 21 serving as positive and negative electrodes are attached. These electrodes 21 are electrically connected to battery cell 12 housed in battery case 13.

As shown in FIGS. 4 and 5, electrode 21 includes a metal terminal 41, a bolt 31 having its tip end protruded upward from metal terminal 41, and a rivet 51 fixing metal terminal 41 to lid 13b.

In the present embodiment, metal terminal 41 has an approximately Z-shape when viewed from the side. Specifically, metal terminal 41 includes a fixing piece 41a fixed to lid 13b, a connecting piece 41b bent at a right angle from fixing piece 41a and extending in a direction away from lid 13b, and a terminal piece 41c continuous to connecting piece 41b and parallel to the fixing piece 41a. Fixing piece 41a and terminal piece 41c have through holes. Rivet 51 passes through the through hole of fixing piece 41a, and bolt 31 passes through the through hole of terminal piece 41c. Though connecting piece 41b is bent at a right angle with respect to fixing piece 41a and terminal piece 41c, the angle is not necessarily be a right angle.

Further, connecting piece 41b may not necessarily have a plate shape, and may have a bent shape. For instance, connecting piece 41b may have two bent portions and have an approximately Z shape when viewed from the side. Specifically, connecting piece 41b may be formed to include a first portion, continuous to the fixing piece 41a in the bending direction and extending in a direction away from box 13, a second portion continuous to the first portion in the bending direction, and a third portion continuous to the second portion in the bending direction and further, at an end portion, continuous to the terminal piece 41c in the bending direction.

As terminal piece 41c and fixing piece 41a are connected by connecting piece 41b, terminal piece 41c and fixing piece 41a are off-set. Metal terminal 41 is formed by bending a metal plate.

In the present embodiment, the distance D in the direction along connecting piece 41b between fixing piece 41a and terminal piece 41c shown in FIGS. 4 and 5 is set to be at least 50% of the width W of connecting piece 41b and at least 5 times the thickness T of connecting piece 41b. More specifically, in the present embodiment, the distance D in the direction along connecting piece 41b between fixing piece 41a and terminal piece 41c is set to be 50% of the width W of connecting piece 41b and 6 times the thickness T of connecting piece 41b.

In the present embodiment, the width W of connecting piece 41b is made equal to the width of fixing piece 41a and terminal piece 41c. The width W of connecting piece 41b, however, may be made smaller than the width of fixing piece 41a and terminal piece 41c. Further, connecting piece 41b may be formed to have a narrowed portion.

In the present embodiment, the thickness T of connecting piece 41b is made equal to the thickness of fixing piece 41a and terminal piece 41c. The thickness T of connecting piece 41b, however, may be made smaller than the thickness of fixing piece 41a and terminal piece 41c. Further, connecting piece 41b may be formed to have a thinner portion.

At a lower end of bolt 31, an expanded section 35 is formed. Expanded section 35 is made larger than the shaft portion of bolt 31 and serves as a retention, and formed to have a rectangular shape when viewed two-dimensionally. Though expanded section 35 is formed to have a rectangular shape when viewed two-dimensionally here, it may have other polygonal shape such as a hexagon, or other shape having a recess or protrusion to be engaged with an abutting portion. Expanded section 35 has a bottom surface and a side surface. At the bottom surface of expanded section 35, a horizontally extending trench 36 is formed. The trench on the bottom surface of expanded section 35 may be omitted, and the bottom may be formed flat.

Between fixing piece 41a of metal terminal 41 and lid 13b, an insulator 43 is provided. Insulator 43 insulates metal terminal 41 from lid 13b, and functions as a gasket sealing the through hole of lid 13b. Insulator 43 includes a base plate portion 44 extending along an upper surface of lid 13b, and a drop preventing section 45 protruding upward from base plate portion 44 for temporarily fixing bolt 31. Insulator 43 may be formed of any insulating material and, by way of example, it is formed of synthetic resin. Here, polyphelylene sulfide (PPS) resin or nylon is used.

On the lower surface of base plate portion 44 of insulator 43, a ring-shaped protrusion 44a is provided, which is inserted to the through hole of lid 13b. On the upper surface of base plate portion 44, fixing piece 41a of metal terminal 41 is arranged. At an outer periphery of base plate portion 44, a peripheral wall 44b is formed, surrounding outer periphery of fixing piece 41a of metal terminal 41. As the fixing piece 41a of metal terminal 41 is surrounded by peripheral wall 44b, more reliable insulation between metal terminal 41 and lid 13b is realized.

Insulator 43 has drop preventing section 45 provided below terminal piece 41c. Drop preventing section 45 is integrally molded with base plate portion 44. Drop preventing section 45 protrudes toward a portion of a lower surface of expanded section 35 of bolt 31. Drop preventing section 45 has a horizontal abutting surface 45a that abuts on the lower surface of expanded section 35 and a vertical abutting surface 45b that abuts on a side surface of expanded section 35.

Since the lower surface of expanded section 35 abuts on the horizontal abutting surface 45a, dropping of expanded section 35 from terminal piece 41c of metal terminal 41 can be prevented. Further, since the side surface of expanded section 35 abuts on vertical abutting surface 45b, large inclination of bolt 31 can be prevented. Vertical abutting surface 45b may be omitted. Further, it is not absolutely necessary that the horizontal abutting surface 45a is horizontal. It may have various shapes in accordance with the shape of expanded section 35 of bolt 31.

At a lower end of rivet 51, a seat 52 of rectangular metal plate is provided. To seat 52, a terminal 71 extending downward is connected as shown in FIG. 3, which terminal 71 is electrically connected to battery cell 12.

Between the upper surface of seat 52 and lid 13b, an insulating member 58 is arranged. Outer peripheral portion of insulating member 58 is suspended downward, surrounding outer periphery of seat 52. For the insulating member 58, a material hard to degrade in an environment in battery case 13 should be used. Here, PPS resin is used.

A ring-shaped gasket 59 is provided to be in tight-contact with an outer circumference of a shaft of rivet 51. Gasket 59 is positioned inside the through hole of insulating member 58, and an upper surface of gasket 59 is in contact with the circumference of through hole in lid 13b. This realizes more reliable tight-sealing of battery case 13. For the gasket, a resin or rubber material may be used.

When electrode 21 is fixed on lid 13b, bolt 31 is inserted beforehand to terminal piece 41c of metal terminal 41, and rivet 51 is inserted in such an order as shown in FIG. 5. In this state, the tip end of rivet is crimped and enlarged, so that electrode 21 is fixed on lid 13b.

At this time, bolt 31 is simply inserted to metal terminal 41 and not yet fixed. The lower surface of expanded section 35 of bolt 31, however, abuts on horizontal abutting surface 45a of drop preventing section 45. Therefore, dropping of bolt 31 from metal terminal 41 can be prevented.

Therefore, it is possible to maintain a state in which bolt 31 is held by metal terminal 41 from the completion of battery module 11 to the next process step, without the necessity of adding any special step such as insertion of bolt 31 with pressure to metal terminal 41.

When battery device 1 is manufactured, first, a plurality of battery modules 11 are arranged. Thereafter, a bus bar 81 for electrically connecting electrodes of battery modules 11 is attached by inserting bolt 31 to the through hole provided in bus bar 81, and by fastening nut 39 to bolt 31, bus bar 81 is fixed. During these process steps, bolt 31 is held by drop preventing section 45 and, therefore, it will not drop from metal terminal 41.

Since drop preventing section 45 is formed integrally with base plate portion 44 for insulation and tight-sealing, the number of process steps is not increased for attaching drop preventing section 45. Further, the number of components is not increased, either. In this manner, bolt 31 can easily be held by metal terminal 41.

Further, the step of inserting bolt 31 with presser to metal terminal 41 can be eliminated and, therefore, deformation of metal terminal 41 in the pressure-insertion step can be prevented. This leads to improved positional accuracy of bolt 31, and hence, to smoother attachment of bus bar 81.

In the present embodiment, metal terminal 41 is formed to include fixing piece 41a fixed to lid 13b, connecting piece 41b bent at a right angle from fixing piece 41a and extending in a direction away from lid 13b, and terminal piece 41c continuous to connecting piece 41b and parallel to the fixing piece 41a. Bolt 31 is inserted to terminal piece 41c, and nut 39 is fastened to bolt 31 to fix bus bar 81. In the present embodiment, fixing piece 41a and terminal piece 41c are off-set and connected by connecting piece 41b and, therefore, in this step of fastening nut 39, moment exerted on terminal 41c is absorbed by deformation of connecting piece 41b and not much transmitted to fixing piece 41a. Fixing piece 41a is fixed to lid 13*b* by rivet 51, and undesirable influence to this fixing structure can be minimized.

Effects attained by adopting metal terminal 41 of such a shape will be described in greater detail. In a battery module, the fixing portion of electrode 21 to the body of battery module is a very important portion in order to ensure the following functions. First, rivet 51 used for fixing functions as an electrical conduction member between metal terminal 41 and battery cell 12. Second, insulator 43 crimped and fixed simultaneously by rivet 51 ensures insulation of battery case 13 from electrode 21 and rivet 51. Third, insulator 43 fixed by rivet 51 also functions to ensure tight-sealing at the fixing portion. In order to reliably attain these functions, it is preferred that as small stress as possible is transmitted through metal terminal 41 to rivet 51 and insulator 43 positioned at the fixing portion.

Such being the case, if the electrode were formed of a flat metal plate, the stress of fastening the nut would be directly transmitted through the electrode to the fixing portion. In that case, if a high stress were applied to the rivet, for example, the rivet would possibly be loosened, or the insulator would possibly be deformed. This possibly leads to a failure of electrical conduction at the rivet, or insufficient insulation or insufficient tight-sealing by the insulator.

In contrast, according to the present embodiment, since the fixing piece 41*a* and terminal piece 41*c* are connected by connecting piece 41*b* and thereby fixing piece 41*a* and terminal piece 41*c* are off-set, even when a high stress is applied to terminal piece 41*c*, connecting piece 41*b* deforms and alleviates the stress applied to the fixing portion. As a result, possibility of the above-described problems can be reduced.

Here, in the present embodiment, the distance D in the direction along the connecting piece 41*b* between fixing piece 41*a* and terminal piece 41*c* shown in FIGS. 4 and 5 is set to be at least 50% of the width W of connecting piece 41*b* and at least 5 times the thickness T of connecting piece 41*b*. Therefore, stiffness of connecting piece 41*b* is sufficiently small. Accordingly, if a high stress is applied to terminal piece 41*c*, connecting piece 41*b* deforms sufficiently to reliably reduce the stress to be applied to the fixing portion. If the distance D in the direction along the connecting piece 41*b* between fixing piece 41*a* and terminal piece 41*c* shown in FIGS. 4 and 5 is smaller than 50% of the width W of connecting piece 41*b* or smaller than 5 times the thickness T of connecting piece 41*b*, connecting piece 41*b* has high stiffness and does not deform sufficiently. Thus, the effect of alleviating the stress applied to the fixing portion becomes weak.

Further, since terminal piece 41*c* and fixing piece 41*a* are connected by connecting piece 41*b*, a space is formed below terminal piece 41*c*, which space can be utilized as a space for accommodating the expanded section 35 of bolt 31 and for drop preventing section 45.

Figure 6:
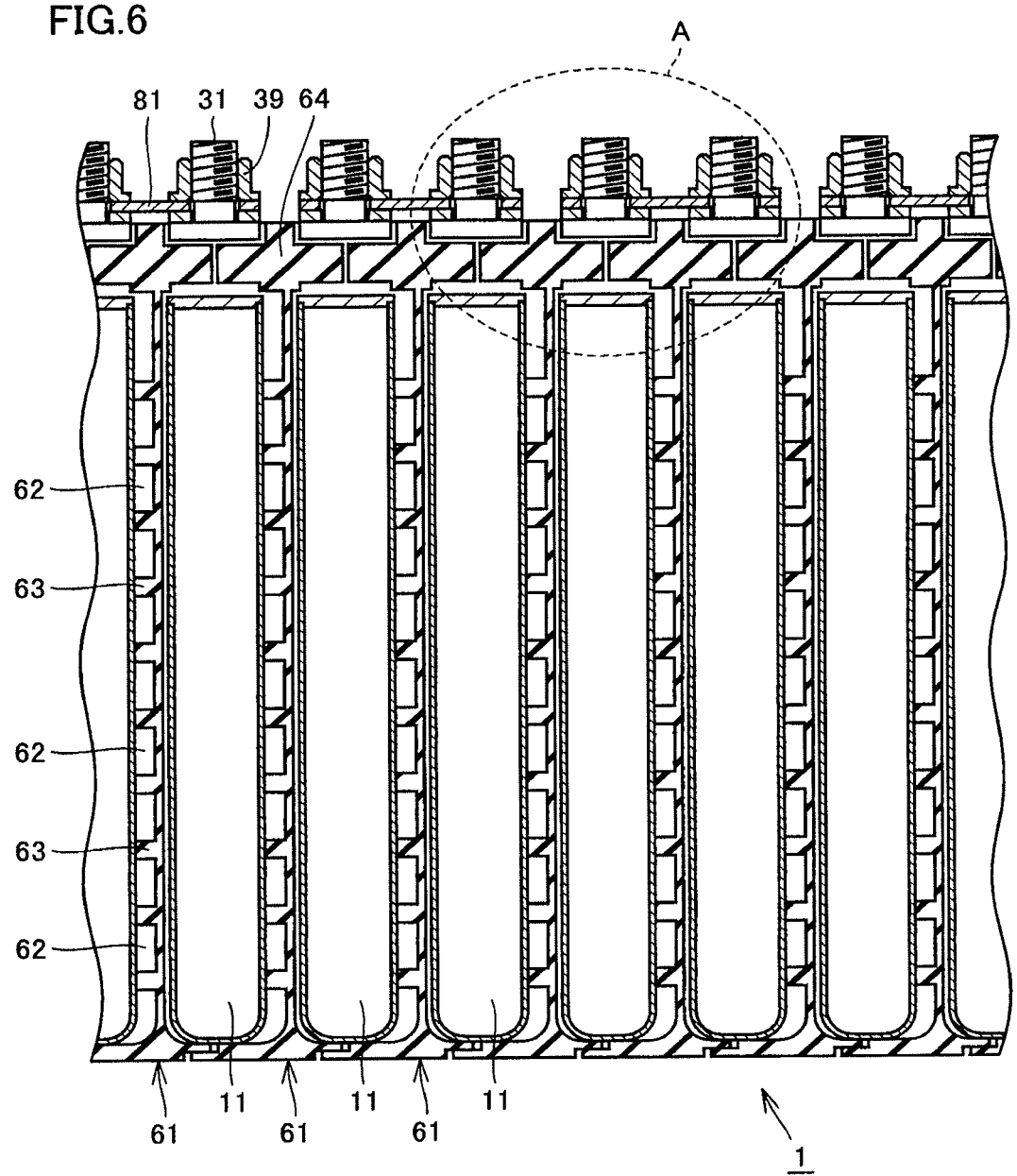
FIG. 6 is a cross-sectional view taken along the line VI-VI of FIG. 1, showing a structure of the battery device in accordance with Embodiment 1 of the present invention.
Figure 7:
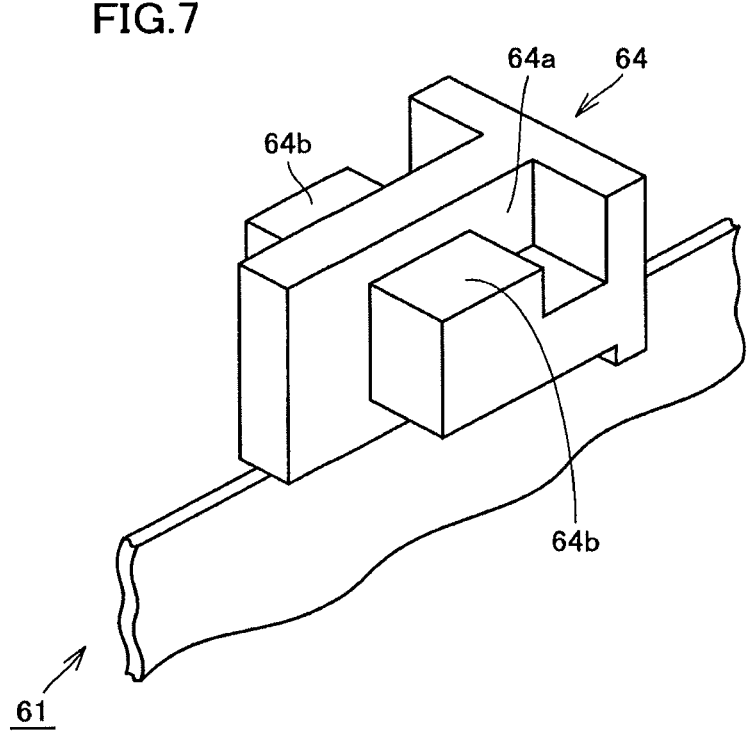
FIG. 7 is a perspective view showing a structure of a joint portion in accordance with Embodiment 1 of the present invention.

FIG. 6 is a cross-sectional view taken along the line VI-VI of FIG. 1, showing a structure of the battery device, and FIG. 7 is a perspective view showing the structure of the contact portion. As described above, battery device 1 includes a plurality of battery modules 11 arranged in parallel. A holding member 61 is arranged in a space between each of the battery modules 11. Holding member 61 includes a plurality of ribs 63 extending in the horizontal direction. A space between ribs 63 forms an air passage 62, and cooling air is supplied to air passage 62. Cooling air cools surfaces of battery modules 11, and reduces heat of battery modules 11. Namely, holding member 61 has a function of cooling battery modules 11.

One surface of holding member 61 and a tip end of each rib 63 are in contact with the surface of battery module 11. Holding member 61 presses the surface of battery module 11 and maintains a constant space to an adjacent battery module, and holds the plurality of modules 11 not to be out of alignment. Holding member 61 is formed of molded resin. Since the holding member 61 is formed of an insulator such as resin, insulation between neighboring battery modules can be ensured.

At an upper end of holding member 61, an abutting portion 64 is provided, which abuts on expanded section 35 of bolt 31. Abutting portion 64 abuts on expanded section 35 of bolt 31, to prevent rotation of bolt 31 when nut 39 is fastened.

Figure 8:
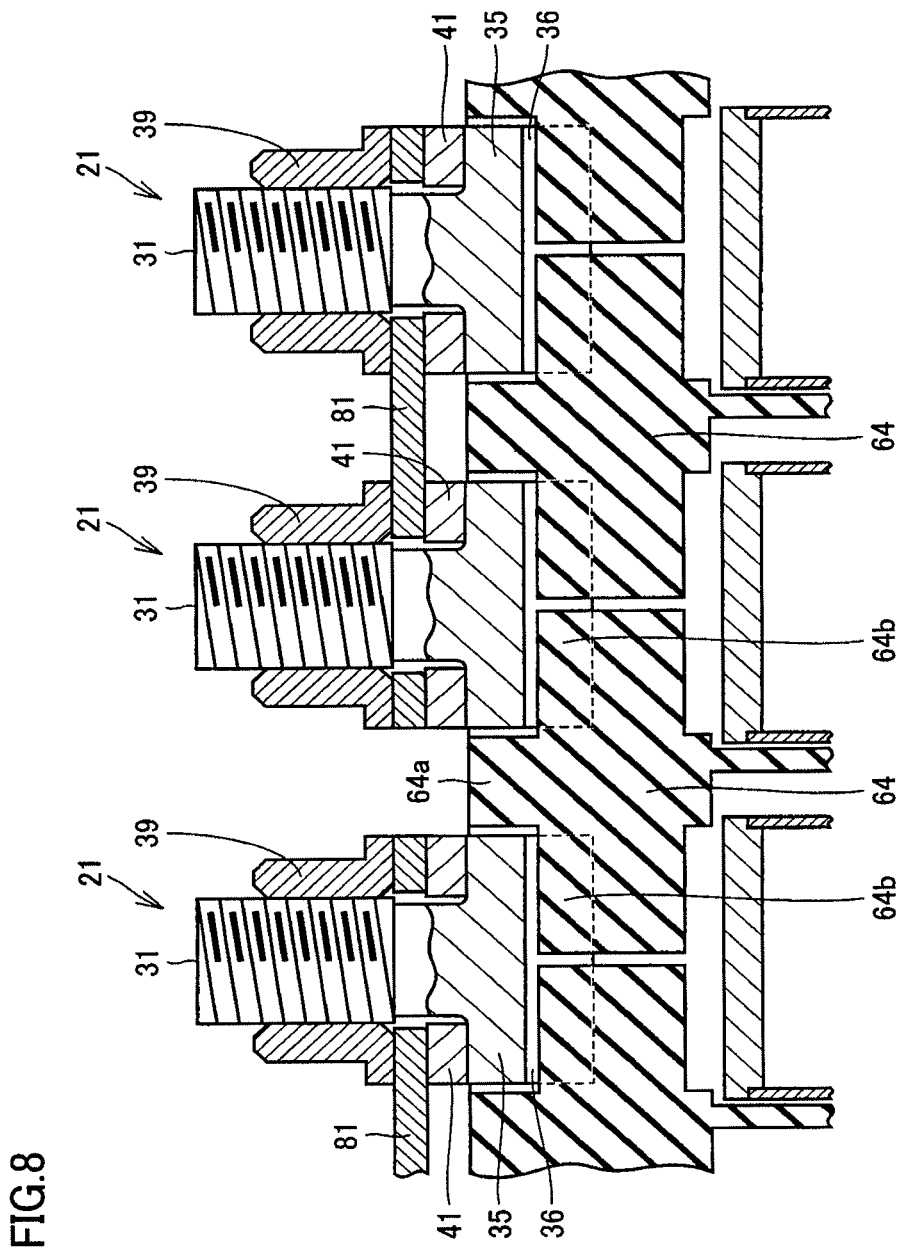
FIG. 8 is an enlarged view of a portion A of FIG. 6, showing the structure of an electrode in accordance with Embodiment 1 of the present invention.

FIG. 8 is an enlarged view of portion A of FIG. 6. As shown in FIGS. 7 and 8, abutting portion 64 has a vertical wall portion 64*a* abutting on a side surface of expanded section 35 of bolt 31, and a horizontal projection 64*b* to be inserted to a trench 36 on a lower surface of expanded section 35.

Referring to FIG. 8, there is a space between expanded section 35 and vertical wall portion 64*a* and horizontal projection 64*b*. When torque is applied to the nut for fastening nut 39, expanded section 35 rotates accordingly. At this time, expanded section 35 comes to abut on one or both of the vertical wall portion 64*a* and horizontal projection 64*b* of abutting portion 64 and, as a result, co-rotation can be prevented. Expanded section 35 of bolt 31 has a rectangular shape when viewed two-dimensionally and, hence, it has a pair of sides extending in parallel. These sides abut opposite vertical wall portions 64*a* of adjacent holding member 61. As the two sides of expanded section 35 abut, larger torque can be accommodated.

In order to more effectively prevent co-rotation of bolt 31, friction stabilizing agent may be applied to increase coefficient of friction between metal terminal 41 and expanded section 35 of bolt 31.

Figure 9:
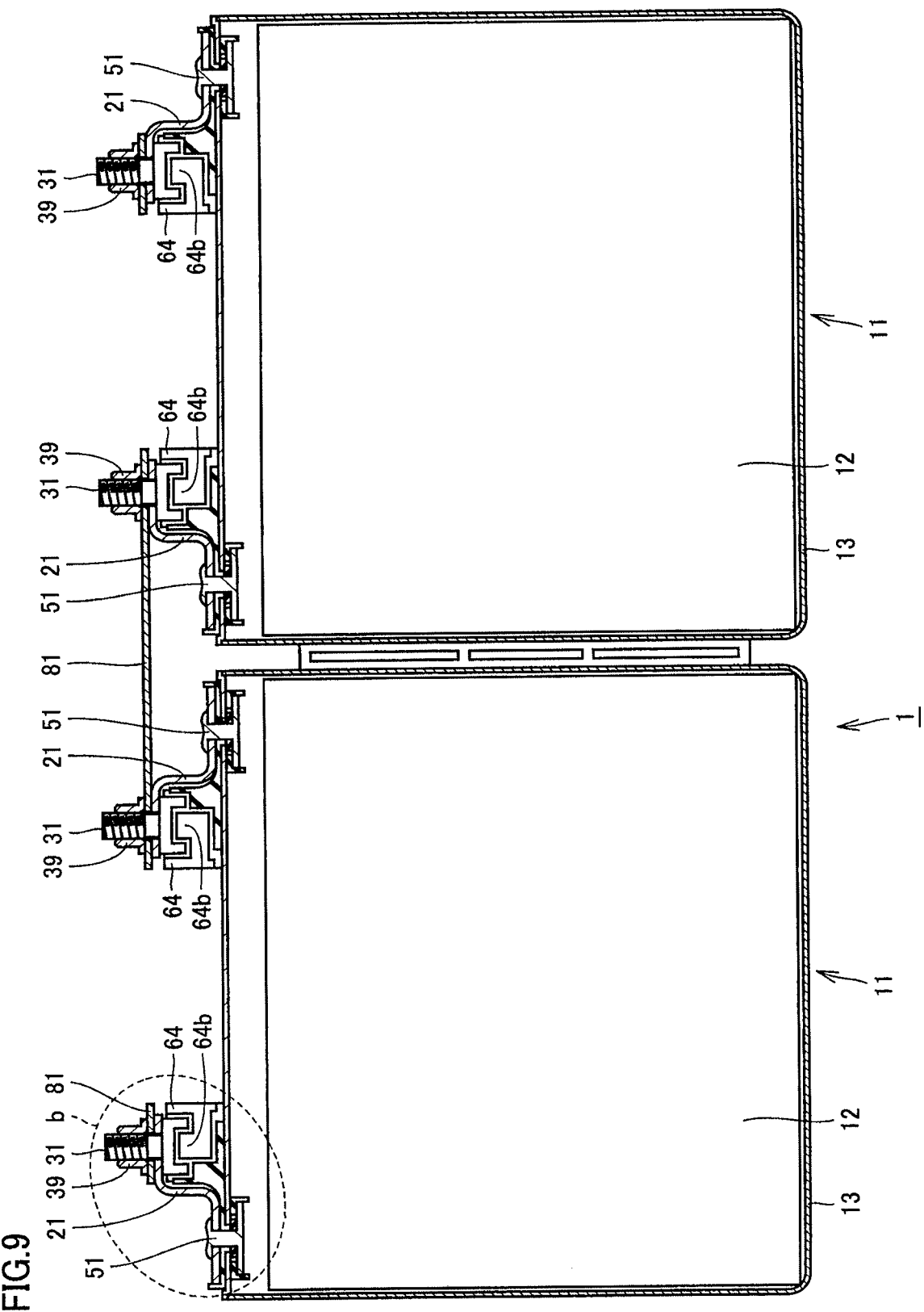
FIG. 9 is a cross-sectional view taken along the line IX-IX of FIG. 1, showing the structure of the electrode in accordance with Embodiment 1 of the present invention.
Figure 10:
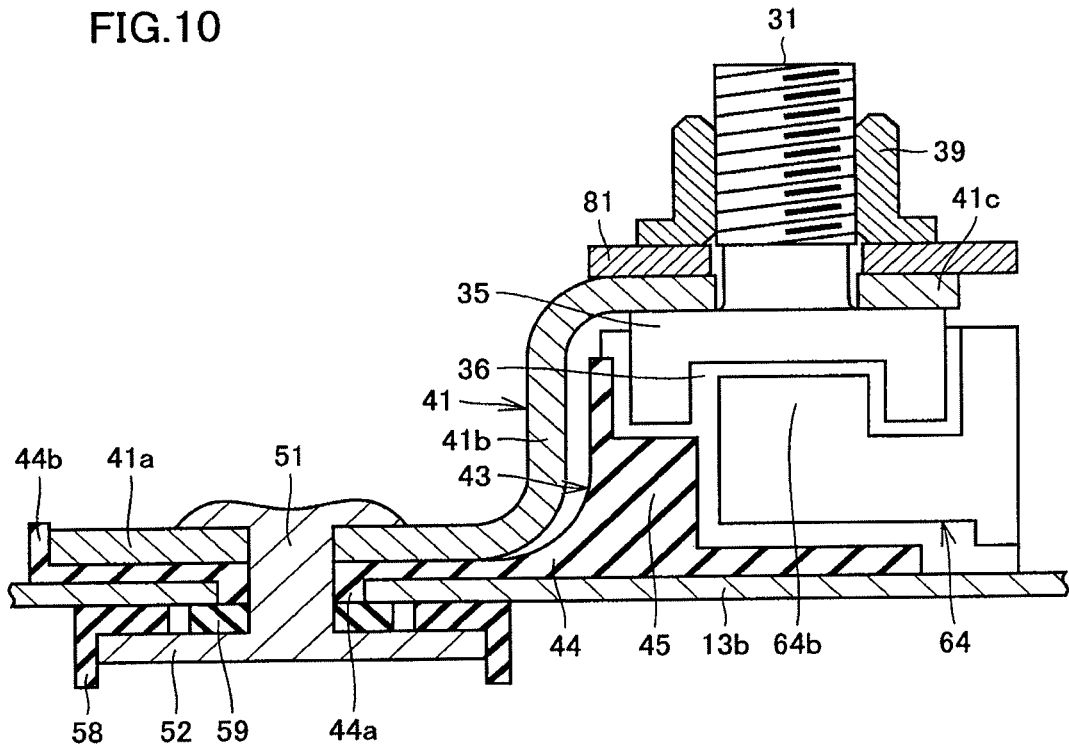
FIG. 10 is an enlarged view of the portion b of FIG. 9, showing the structure of the electrode in accordance with Embodiment 1 of the present invention.

FIG. 9 is a cross-sectional view taken along the line IX-IX of FIG. 1, showing the structure of the battery module, and FIG. 10 is an enlarged view of portion b of FIG. 9. As described above, trench 36 is provided at the bottom surface of enlarged section 35 of bolt 31, and in trench 36, horizontal projection 64*b* of abutting portion 64 is positioned. When torque is applied to nut 39 and expanded section 35 co-rotates, inner side surface of trench 36 comes to abut on the side surface of horizontal projection 64*b*.

In the present embodiment, vertical wall portion 64*a* is adapted to abut on the side surface of expanded section 35 and horizontal projection 64*b* is adapted to abut on the inner side surface of trench 36 at the bottom surface of expanded section 35 and, therefore, even when a high torque is applied, co-rotation of bolt 31 can surely be prevented. It is noted, however, that the structure of abutting portion 64 may be determined as needed, and only the vertical wall portion 64*a* may be adapted to abut, in order to prevent co-rotation of bolt 31.

Further, since the torque applied to nut 39 is received by abutting portion 64 provided at holding member 61, the force applied to metal terminal 41 can be reduced. This can alleviate undesirable deformation and the like of metal terminal 41. As shown in FIG. 8, on abutting portion 64 of holding member 61, bolt 31 of adjacent electrode 21 abuts. However, since the holding member 61 is formed of an insulating material as described above, insulation between electrodes 21 can be ensured.

Here, expanded section 35 of bolt 31 is formed to have a rectangular shape when viewed two-dimensionally, and its side surface abuts on vertical wall portion 64*a*. It is also possible to form a recess or a protrusion around the expanded section 35 of bolt 31, and to provide an abutting portion having a shape matching the recess or the protrusion.

Embodiment 2

Figure 11:
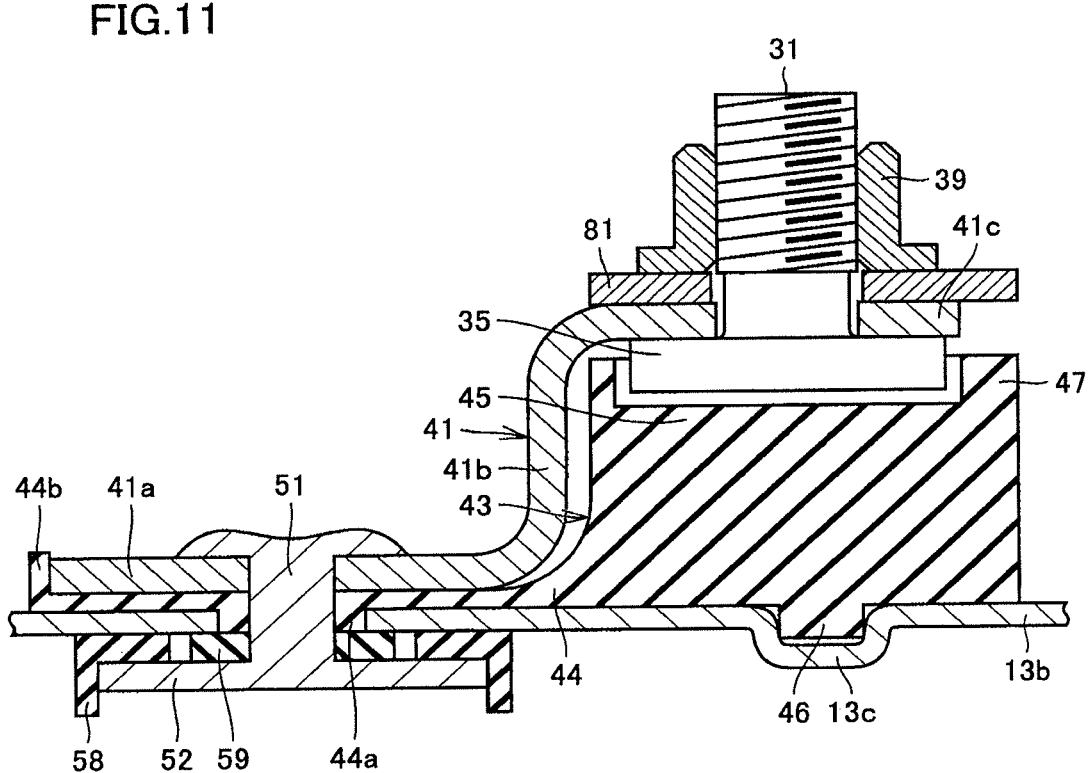
FIG. 11 is a vertical sectional view showing a structure of an electrode in accordance with Embodiment 2 of the present invention.

Next, Embodiment 2 will be described with reference to FIG. 11. FIG. 11 is a vertical sectional view showing a structure of an electrode, and it corresponds to FIG. 10 of Embodiment 1.

In the present embodiment, the structure of insulator 43 is changed such that insulator 43 serves to prevent dropping and co-rotation of bolt 31. Specifically, insulator 43 is formed to surround expanded section 35 of bolt 31, and expanded to fill the space between the lower side of bolt 31 and lid 13b, to form drop preventing section 45. Further, at a lower surface of insulator 43 and lower side of drop preventing section 45, an engaging projection 46 is formed, protruded downward.

Expanded section 35 of bolt 31 abuts on drop preventing section 45 and, therefore, dropping from metal terminal 41 is prevented. Further, as the expanded section 35 of bolt 31 is surrounded by wall portion 47 provided in drop preventing section 45, rotation of expanded section 35 is prevented by drop preventing section 45 when torque is applied to nut 39, and hence, co-rotation can be prevented.

At this time, as the engaging projection 46 is provided at the bottom surface of insulator 43 and engaging projection 46 is inserted to recessed portion 13c of lid 13b, positional deviation of insulator 43 can be prevented, and co-rotation of bolt 31 can more reliably be prevented.

Further, metal terminal 41 in accordance with the present embodiment has the same shape as that of Embodiment 1. Therefore, as in Embodiment 1, even when large stress is applied to the terminal piece 41c, connecting piece 41b deforms and, therefore, the stress applied to the fixing portion between metal terminal 41 and case 13 can be alleviated.

Embodiment 3

Figure 12:
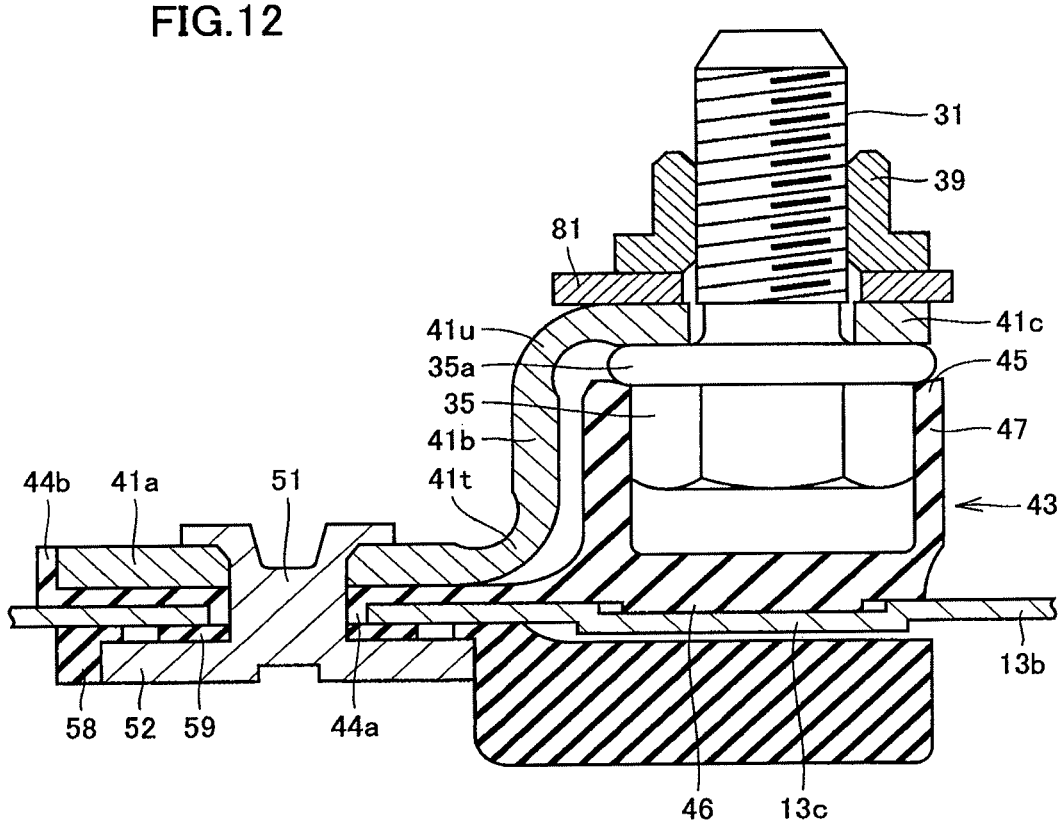
FIG. 12 is a vertical sectional view showing a structure of an electrode in accordance with Embodiment 3 of the present invention.
Figure 13:
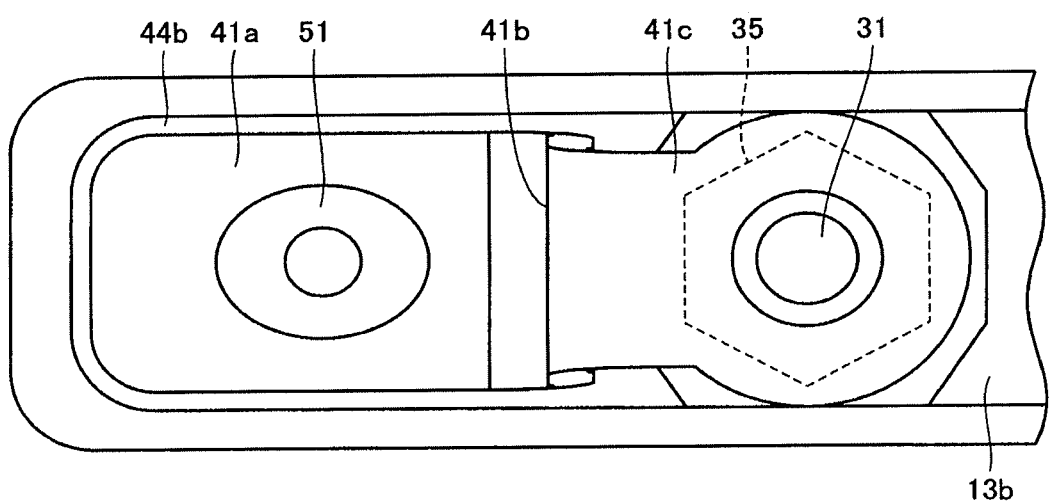
FIG. 13 is a plan view showing the structure of the electrode in accordance with Embodiment 3 of the present invention.

Next, Embodiment 3 will be described with reference to FIGS. 12 and 13. FIG. 12 is a vertical sectional view showing a structure of an electrode, and it corresponds to FIG. 10 of Embodiment 1. FIG. 13 is a plan view of the battery module in accordance with the present embodiment. FIG. 13 shows a state before bus bar 81 is attached.

In the present embodiment, as in Embodiment 2, insulator 43 serves to prevent dropping and co-rotation of bolt 31. Further, in the present embodiment, stiffness reduced portion is formed at the bent portion of metal terminal 41.

In the present embodiment, expanded section 35 of bolt 31 is formed to have a hexagonal shape, and a flange 35a is provided on the screw-side end of expanded section 35. Flange 35a protrudes outward from the body of expanded section 35.

Drop preventing section 45 of insulator 43 is provided with a wall portion 47 that surrounds expanded section 35 of bolt 31. Wall portion 47 forms a hexagonal recess, to which the hexagonal body of expanded section 35 is inserted. Since the expanded section 35 is inserted to the recess formed by wall portion 47, co-rotation of bolt 31 can be prevented when torque is applied to nut 39.

Further, an upper end of wall portion 47 abuts on flange 35a from below, and therefore, bolt 31 is prevented from dropping down.

At a lower surface of insulator 43 and below drop preventing section 45 and wall portion 47, an engaging projection 46 is provided, projecting downward. Engaging projection 46 is inserted to a recess 13c of lid 13b. This prevents significant positional deviation of insulator 43 and, hence, co-rotation of bolt 31 can more reliably be prevented.

Metal terminal 41 has, as in Embodiment 1 and Embodiment 2, fixing piece 41a, connecting piece 41b continuous to fixing piece 41a in a bending direction, and terminal piece 41c continuous to connecting piece 41b in the bending direction.

Further, as in Embodiment 1, connecting piece 41b may not necessarily have a plate shape, and may have a bent shape. For instance, connecting piece 41b may have two bent portions and have an approximately Z shape when viewed from the side.

At a bent portion 41t positioned at a boundary between fixing piece 41a and connecting piece 41b and a bent portion 41u positioned at a boundary between connecting piece 41b and terminal piece 41c of metal terminal 41, inside corner (inner angle side of bent portion) is depressed in a dent to draw a curve, to form stiffness reduced portions. Inner surface of dents at bent portions 41t and 41u forming the stiffness reduced portions do not necessarily have a curved surface.

Consequently, in the step of fastening bus bar 81 by applying torque to nut 39, bent portions 41t and 41u forming the stiffness reduced portions deform, and therefore, transmission of the fastening force applied to nut 39 to fixing piece 41a can be reduced. Thus, possibility of loosening of rivet 51 and deformation of insulator 43 or gasket 59 can be reduced.

Particularly, if any force is applied in a direction of moving terminal piece 41c upward/downward, it is transmitted as the force moving fixing piece 41a upward/downward. Therefore, such force is problematic as it leads to loosening of rivet 51. In the structure of the present embodiment, bent portions 41t and 41u are depressed to have dents and, therefore, stiffness can be lowered particularly with respect to the force in the direction of moving terminal piece 41c upward/downward. Consequently, the problematic loosening of rivet 51 can effectively be prevented. As a result, degradation of sealing effect attained by insulator 43 or gasket 59 can effectively be prevented.

Further, in the present embodiment, dents are formed to draw a curve at the inside corners of bent portions 41t and 41u and, as a result, radius of curvature at the inside corner becomes larger. This alleviates stress concentration at the inside corners of bent portions 41t and 41u. As a result, decrease in strength of bent portions 41t and 41u can be minimized.

In addition, in the present embodiment, the stiffness reduced portions are provided only in the bent portions 41t and 41u. If the stiffness is simply to be reduced, plate thickness of metal terminal 41 may be reduced for the entire length. If the plate thickness is reduced for the entire length of metal terminal 41, the ratio of cross sectional area/surface area of metal terminal 41 decreases, resulting in a problem of heat build-up caused by self-heating. By reducing plate thickness locally as in the present embodiment, decrease in the ratio of cross sectional area/surface area can be minimized.

Though the stiffness reduced portions are formed by providing dents on the inside corners of bent portions 41t and 41u in the present embodiment, it is also possible to form the stiffness reduced portion by grinding down the outside corner (outer angle side of bent portion).

Only one of the bent portions 41t and 41u may be processed to be the stiffness reduced portion.

As described above, a bent portion may be provided in connecting piece 41b so that connecting piece 41b has a bent shape. In that case, the bent portion inside connecting piece 41b may also be formed as a stiffness reduced portion. Further, bent portions 41t and 41u may not be formed as the stiffness reduced portions and only one or more of the bent portions inside the connecting piece 41b may be formed as the stiffness reduced portions.

Further, it is also possible to form the stiffness reduced portion by making narrower the width of metal terminal 41 only at bent portions 41t and 41u. The stiffness reduced portion may be formed by the combination of these methods.

The stiffness reduced portion at the bent portion of metal terminal 41 as described with reference to Embodiment 3 may also be formed in the structures of Embodiment 1 and Embodiment 2.

Figure 14:
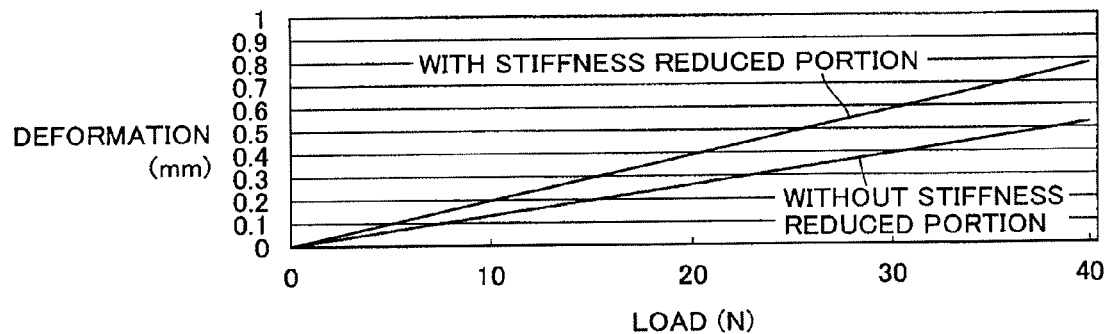
FIG. 14 shows how easily the metal terminal in accordance with Embodiment 3 of the present invention deforms.

FIG. 14 shows how easily the metal terminals deform to load, comparing the metal terminal provided with the stiffness reduced portion in accordance with the present invention and a metal terminal not provided with the stiffness reduced portion.

As shown in FIG. 14, when the stiffness reduced portion is provided, deformation is 1.5 times higher to the same load, than when the stiffness reduce portion is not provided. Specifically, transmission of external force can be reduced to ⅔. As a result, even if a force sufficient to cause compressed gasket 59 to expand 0.03 mm when the stiffness reduced portion is not provided, the expansion can be reduced to 0.02 mm when the stiffness reduced portion is provided. This secures squeeze of the sealing rubber and, typically, its life can be made longer by about 5 to about 10 years.

FIG. 14 shows results of calculation when a metal plate having the plate thickness of 1.0 mm was used and the minimum thickness at the stiffness reduced portion was set to 0.7 mm.

Figure 15:
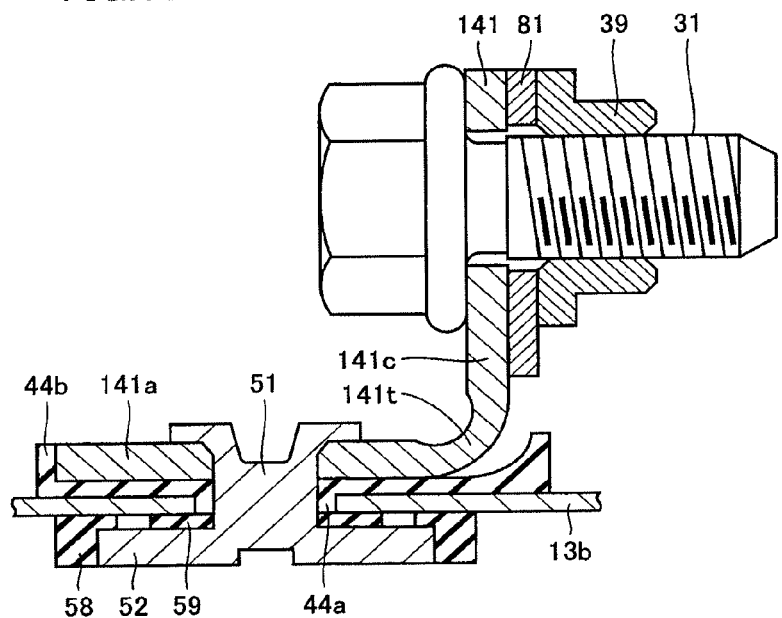
FIG. 15 is a vertical sectional view showing a structure of a reference example provided with a portion of reduced stiffness.

FIG. 15 shows a reference example of a metal terminal 141 provided with the stiffness reduced portion. Metal terminal 141 shown in FIG. 15 is bent only once. Specifically, it has an L-shape, with only one bent portion 141t. An inside corner of bent portion 141t is depressed to form a dent, so that the stiffness reduced portion thinner than other portions is formed.

If there is one or more bent portions, it is possible to form the stiffness reduced portion at the bent portion. Therefore, the effect of alleviating the force applied to terminal piece 141c of metal terminal 141 at the stiffness reduced portion and reducing transmission to fixed piece 141a can be attained.

Although the present invention has been described and illustrated in detail, it is clearly understood that the same is by way of illustration and example only and is not to be taken by way of limitation, the scope of the present invention being interpreted by the terms of the appended claims.

INDUSTRIAL APPLICABILITY

The electrode structure and the method of manufacturing battery device in accordance with the present invention allow temporary fixing with an insulator. Therefore, temporary fixing of a bolt to a metal terminal can be done easily. Further, using the temporarily fixed bolt, a bus bar can easily be attached to the electrode.

The invention claimed is:

1. A battery module with a case having a battery cell housed therein, comprising:
    a metal terminal having a fixing piece provided with a through hole, and extending from said case;
    an insulator insulating said metal terminal and said case from each other; and
    a rivet;
    said insulator having a ring-shaped protrusion inserted in a through hole provided through said case,
    said rivet fixing said fixing piece to said case through said through hole of said fixing piece and said ring-shaped protrusion of said insulator.

2. The battery module according to claim 1, wherein said insulator has a peripheral wall surrounding an outer periphery of said fixing piece of said metal terminal.

3. The battery module according to claim 1, further comprising a gasket in tight-contact with a tip of said ring-shaped protrusion and said rivet.

4. The battery module according to claim 1, further comprising a bolt having an expanded section forming a retaining section at a rear end, and penetrating said metal terminal upward, wherein said insulator has a base plate portion extending along said case, and a horizontal abutting surface formed integrally with said base plate portion and provided at a location protruding from said base plate portion upward, said expanded section having a lower surface abutting on said horizontal abutting surface.

5. The battery module according to claim 1, further comprising a bolt having an expanded section forming a retaining section at a rear end, and penetrating said metal terminal upward, wherein said insulator has a vertical abutting surface abutting on a side surface of said expanded section.

* * * * *